(No Model.)
D. C. McGREGOR.
BRAKE MECHANISM.
No. 507,834. Patented Oct. 31, 1893.
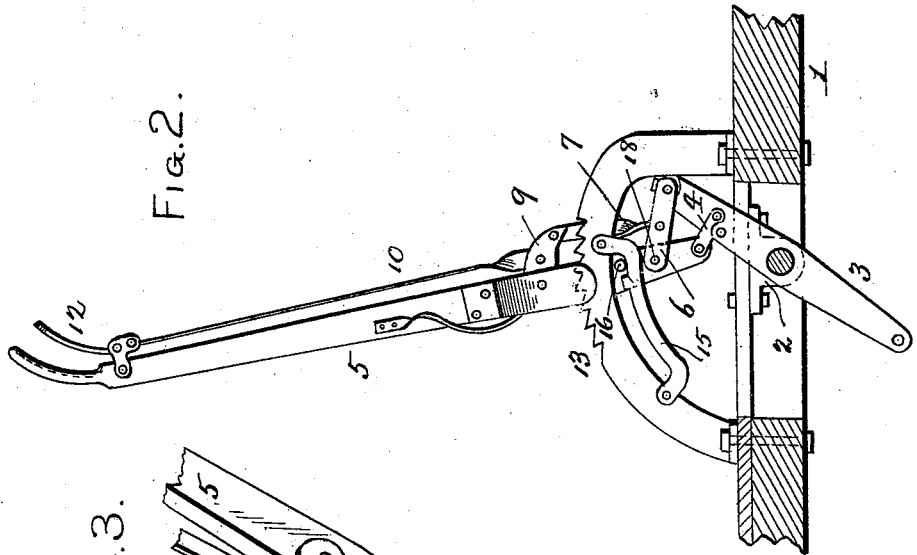
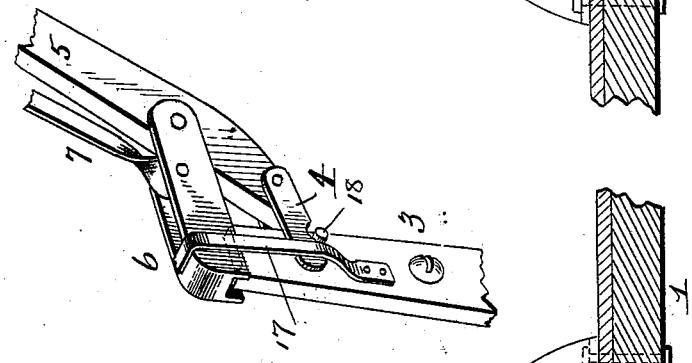
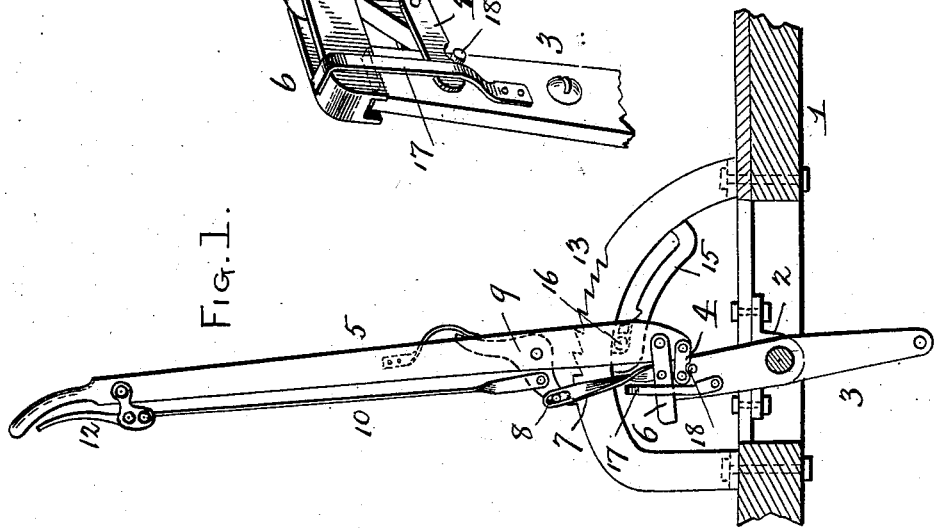
WITNESSES:
F. L. Ourand
W. D. Coombs
INVENTOR:
DAVID C. McGREGOR,
by Louis Bagger & Co.
Attorneys

UNITED STATES PATENT OFFICE.

DAVID CARROUTHERS McGREGOR, OF EAST OAKLAND, CALIFORNIA.

BRAKE MECHANISM.

SPECIFICATION forming part of Letters Patent No. 507,834, dated October 31, 1893.

Application filed May 8, 1893. Serial No. 473,457. (No model.)

*To all whom it may concern:*

Be it known that I, DAVID CARROUTHERS MCGREGOR, a citizen of the United States, and a resident of East Oakland, in the county of Alameda and State of California, have invented certain new and useful Improvements in Brake Mechanism; and I do hereby declare that the following is a full, clear, and exact description of the invention, which will enable others skilled in the art to which it appertains to make and use the same, reference being had to the accompanying drawings, which form a part of this specification.

My invention relates to means for operating the brakes, especially those of electric motor and cable cars, the object being to provide an improved construction of the same in which the brake lever requires less space to operate and is always in easy reach of the gripman or motorman, enabling the brakes to be applied or set readily and quickly.

The invention consists in the novel construction and combination of parts hereinafter fully described and claimed.

In the accompanying drawings: Figure 1 represents a sectional view of a portion of a street car with my improvements applied thereto, the parts being in the position they assume when the brakes are released. Fig. 2 is a similar view showing the position when the brakes are set or applied. Fig. 3 is a detail view.

In the said drawings, the reference numeral 1 designates the floor of the car in which is journaled or pivoted at its center in bearings 2, a vertical bar 3, with the lower end of which the brake bars or chains are connected. Near its upper end this bar is pivotally connected by links 4 with a hand lever 5. A short distance above its lower end the lever 5 is provided with a pivoted cap 6, adapted to engage with the upper end of bar 3. Secured to this cap is a short arm 7, having a slot at its upper end with which engages a stud 8, on a dog or pawl 9, pivoted to said lever. This pawl is provided with a rod 10, connected at its upper end with a short lever 12, pivoted to lever 5. The pawl is adapted to engage with teeth or serrations on a quadrant 13, secured to the car. Secured to this quadrant is a rod 15, forming a guide for a stud 16 on lever 5, by which the movement of the lever is limited.

Secured to the upper end of bar 3 is a bar 17, having its upper or free end bent at a right angle forming a guard for the cap 6 so as to prevent its being thrown up too far in its movement.

The operation is as follows: In the position shown in Fig. 1, the cap 6 is thrown out of engagement with the end of bar 3, so that all pressure on the wheel is relieved. To set the brakes the lever 5 is moved forward a short distance causing the cap 6 and the end of bar 3 to become engaged with each other forming a rigid joint between the lever and the bar. By now pulling the lever back the brakes are applied, as usual. To release the brakes the pawl is disengaged from the teeth in the quadrant and the lever pushed forward until its movement is limited by the stud 16. By a still further pressure on the short pawl lever the pawl is raised higher and its stud engages with the upper end of the slot in arm 7 which will raise the cap 6, and throw it out of engagement with the end of the bar 3, when the parts will be in the position shown in Fig. 1.

The numeral 18 designates a stud on the rim 3 with which link 4, engages forming a stop to prevent pulling back of lever when not connected with the bar.

Having thus fully described my invention, what I claim is—

1. In a brake mechanism the combination with the pivoted bar, the lever pivoted thereto and the pivoted cap, of means for throwing said cap and bar into and out of engagement, substantially as described.

2. In a brake mechanism the combination with the pivoted bar, the lever pivotally connected therewith and the cap pivoted to said lever, of the arm secured to said cap having a slot in its upper end, the pawl having a stud engaging with said slot pivoted to said lever, the quadrant having teeth, and means substantially as described for actuating said pawl.

3. In a brake mechanism the combination with the pivoted bar, provided with a stud, the lever pivotally connected therewith and the cap pivoted to said lever, of the arm secured to said cap provided with a slot in its upper end, the pawl pivoted to said lever having a stud engaging with said slot, the quadrant having teeth and a guide rod, the stud on the lever engaging with said rod, the guard on the said bar for limiting the movement of the cap and means for operating said pawl, substantially as described.

In testimony that I claim the foregoing as my own I have hereunto affixed my signature in presence of two witnesses.

DAVID CARROUTHERS McGREGOR.

Witnesses:
ALBERT SCHMIDT,
JOHN HARRINGTON.